United States Patent
Zhang et al.

(10) Patent No.: US 8,585,548 B2
(45) Date of Patent: Nov. 19, 2013

(54) SYSTEM AND METHOD FOR CONTROLLING AN AUTOMATIC ENGINE STOP-START

(75) Inventors: Zhen J. Zhang, Canton, MI (US); Casie M. Bockenstette, Clarkston, MI (US); Paul G. Otanez, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 250 days.

(21) Appl. No.: 13/228,275

(22) Filed: Sep. 8, 2011

(65) Prior Publication Data

US 2012/0088630 A1    Apr. 12, 2012

Related U.S. Application Data

(60) Provisional application No. 61/391,311, filed on Oct. 8, 2010.

(51) Int. Cl.
*B60W 10/10* (2012.01)

(52) U.S. Cl.
USPC .......................................................... 477/110

(58) Field of Classification Search
USPC ........... 477/110, 52, 107, 97, 98, 37, 38, 111, 477/115, 145
See application file for complete search history.

(56) References Cited

U.S. PATENT DOCUMENTS

| | | | |
|---|---|---|---|
| 8,056,666 B2 * | 11/2011 | Portell et al. .................. | 180/165 |
| 2003/0022757 A1 * | 1/2003 | Shimabukuro et al. ........ | 477/115 |
| 2010/0311538 A1 * | 12/2010 | Miyabe et al. .................... | 477/2 |
| 2011/0039657 A1 * | 2/2011 | Gibson et al. ................. | 477/115 |
| 2011/0263381 A1 * | 10/2011 | Katou ............................ | 477/115 |

* cited by examiner

*Primary Examiner* — David D Le
*Assistant Examiner* — David J Hlavka

(57) ABSTRACT

A system and method for controlling automatic stop-start of a motor vehicle is provided. The system and method is configured to enable an automatic stop-start mode of operation based on vehicle conditions. In addition, the system and method is configured to selectively actuate an accumulator to prime the transmission for a smooth restart.

13 Claims, 4 Drawing Sheets

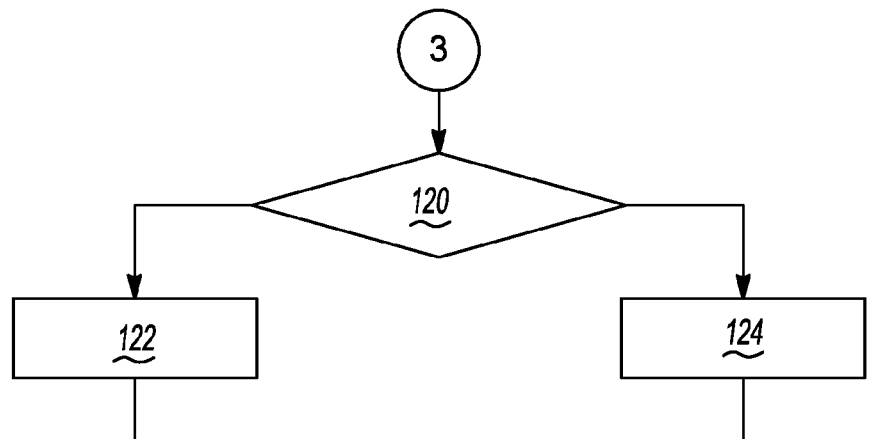
*Fig-3C*
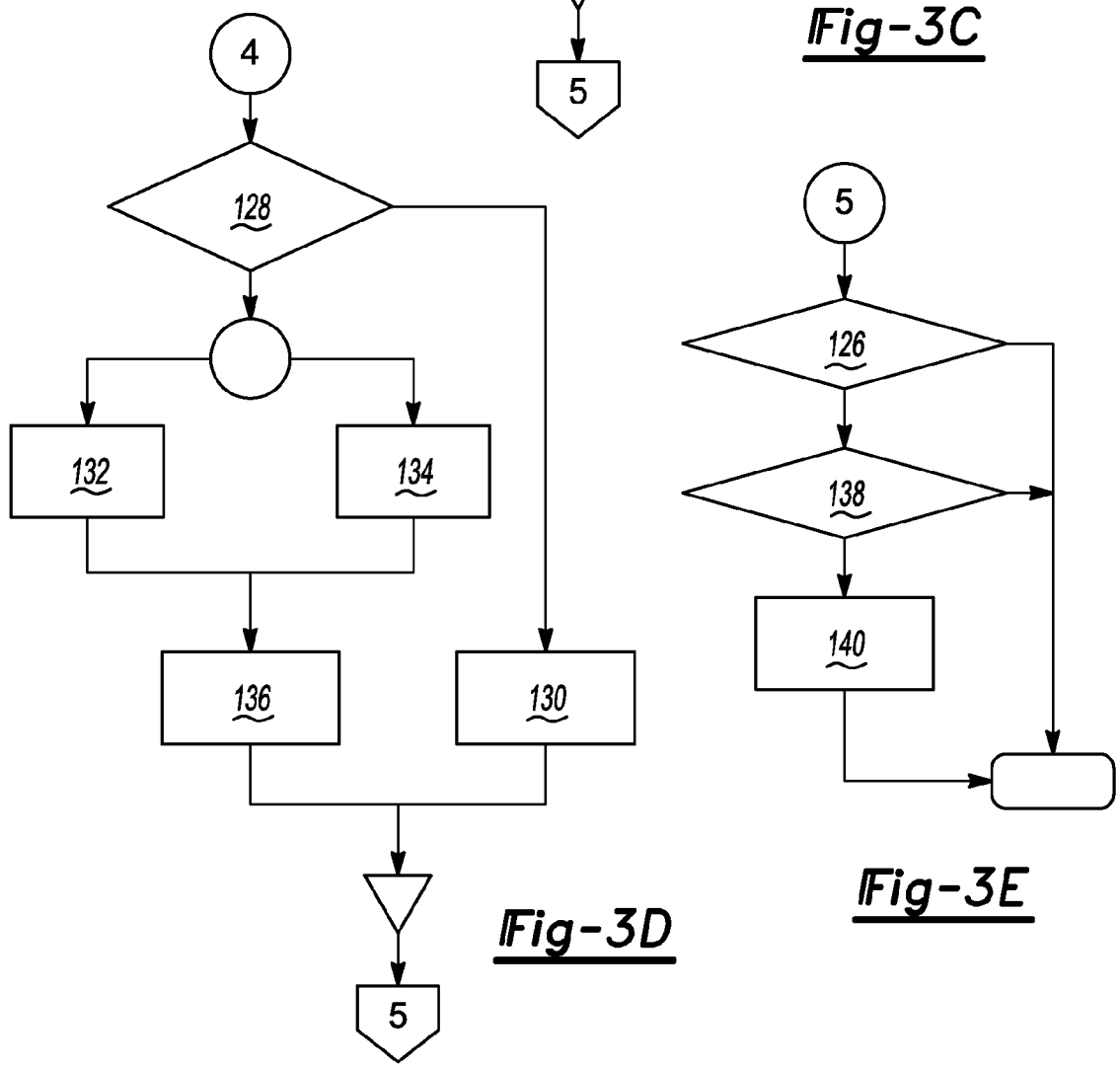
*Fig-3D*
*Fig-3E*

SYSTEM AND METHOD FOR CONTROLLING AN AUTOMATIC ENGINE STOP-START

CROSS-REFERENCE

This application claims the benefit of U.S. Provisional Application No. 61/391,311, filed Oct. 8, 2010. The entire contents of the above application are incorporated herein by reference.

FIELD

The present disclosure relates to a system and method for controlling an automatic engine stop-start, and more particularly to a system and method for controlling an automatic engine stop-start using measured vehicle conditions and an accumulator.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios.

In order to increase the fuel economy of motor vehicles, it is desirable to stop the engine during certain circumstances, such as when stopped at a red light or idling. However, during this automatic stop, the pump is no longer driven by the engine. Accordingly, hydraulic fluid pressure within the hydraulic control system drops. This leads to clutches and/or brakes within the transmission to be fully disengaged. As the engine restarts, these clutches and/or brakes may take time to reengage fully, thereby producing slippage and delay between engagement of the accelerator pedal or release of the brake and the movement of the motor vehicle. Additionally, there are conditions where automatically stopping the engine is not desirable, such as during brief stops or idling while still moving.

Therefore, there is a need in the art for a system and method for controlling automatic engine stop-starts based on motor vehicle operating conditions as well as providing controllability of the motor vehicle during engine restart.

SUMMARY

A system and method for controlling automatic stop-start of a motor vehicle is provided. The system and method is configured to enable an automatic stop-start mode of operation based on vehicle conditions. In addition, the system and method is configured to selectively actuate an accumulator to prime the transmission for a smooth restart.

In one example, the system and method uses engine speed, vehicle speed, transmission temperature, and engine temperature to determine whether an automatic stop should be activated.

In another example, the system and method uses the state of the transmission to determine whether an automatic stop should be inhibited.

In yet another example, the system and method controls the accumulator using engine status indicators.

In yet another example, the system and method controls the accumulator using brake pedal position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 3A-3E is a flow chart illustrating a method of operating the motor vehicle of FIGS. 1-2 according to the principles of the present invention.

DETAILED DESCRIPTION

The following description is merely exemplary in nature and is not intended to limit the present disclosure, application, or uses.

Figure 1:
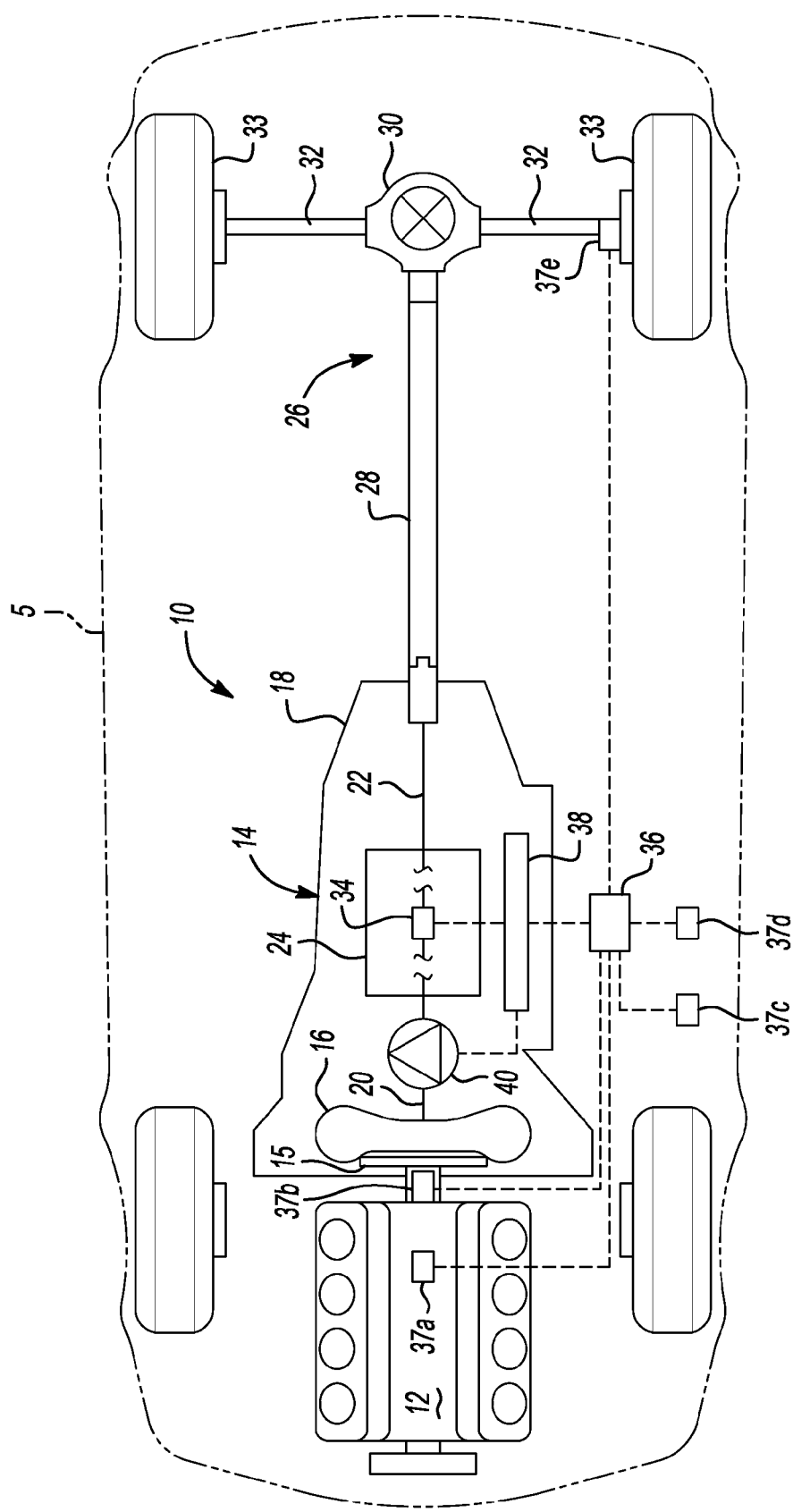
FIG. 1 is a schematic diagram of an exemplary powertrain in a motor vehicle.

With reference to FIG. 1, a motor vehicle is shown and generally indicated by reference number 5. The motor vehicle 5 is illustrated as a passenger car, but it should be appreciated that the motor vehicle 5 may be any type of vehicle, such as a truck, van, etc. The motor vehicle 5 includes an exemplary powertrain 10. It should be appreciated at the outset that while a rear-wheel drive powertrain has been illustrated, the motor vehicle 5 may have a front-wheel drive powertrain without departing from the scope of the present invention. The powertrain 10 generally includes an engine 12 interconnected with a transmission 14.

The engine 12 may be a conventional internal combustion engine or an electric engine, or any other type of prime mover, without departing from the scope of the present disclosure. The engine 12 supplies a driving torque to the transmission 14 through a flexplate 15 or other connecting device that is connected to a starting device 16. The starter device 16 may be a hydrodynamic device, such as a fluid coupling or torque converter, a wet dual clutch, or an electric motor. It should be appreciated that any starting device between the engine 12 and the transmission 14 may be employed.

The transmission 14 includes a typically cast, metal housing 18 which encloses and protects the various components of the transmission 14. The housing 18 includes a variety of apertures, passageways, shoulders and flanges which position and support these components. Generally speaking, the transmission 14 includes a transmission input shaft 20 and a transmission output shaft 22. Disposed between the transmission input shaft 20 and the transmission output shaft 22 is a gear and clutch arrangement 24. The transmission input shaft 20 is functionally interconnected with the engine 12 via the starting device 16 and receives input torque or power from the engine 12. Accordingly, the transmission input shaft 20 may be a turbine shaft in the case where the starting device 16 is a hydrodynamic device, dual input shafts where the starting device 16 is dual clutch, or a drive shaft where the starting device 16 is an electric motor. The transmission output shaft 22 is preferably connected with a final drive unit 26 which includes, for example, propshaft 28, differential assembly 30, and drive axles 32 connected to wheels 33. The transmission input shaft 20 is coupled to and provides drive torque to the gear and clutch arrangement 24.

The gear and clutch arrangement 24 includes a plurality of gear sets, a plurality of clutches and/or brakes, and a plurality of shafts. The plurality of gear sets may include individual intermeshing gears, such as planetary gear sets, that are connected to or selectively connectable to the plurality of shafts through the selective actuation of the plurality of clutches/brakes. The plurality of shafts may include layshafts or countershafts, sleeve and center shafts, reverse or idle shafts, or combinations thereof. The clutches/brakes, indicated schematically by reference number 34, are selectively engageable to initiate at least one of a plurality of gear or speed ratios by selectively coupling individual gears within the plurality of gear sets to the plurality of shafts. It should be appreciated that the specific arrangement and number of the gear sets, clutches/brakes 34, and shafts within the transmission 14 may vary without departing from the scope of the present disclosure.

The motor vehicle 5 includes a control module 36. The control module 36 may be a transmission control module, an engine control module, or both or hybrid control module, or any other type of controller. The control module 36 is preferably an electronic control device having a preprogrammed digital computer or processor, control logic, memory used to store data, and at least one I/O peripheral. The control logic includes a plurality of logic routines for monitoring, manipulating, and generating data. The control module 36 controls the actuation of the clutches/brakes 34 via a hydraulic control system 38. The hydraulic control system 38 is operable to selectively engage the clutches/brakes 34 by selectively communicating a hydraulic fluid to the clutches/brakes 34 that engages the clutches/brakes 34. The control module 36 is also in communication with a plurality of sensors located throughout the motor vehicle 5. For example, the control module 36 communicates with engine speed and temperature sensors 37A and 37B, a brake pedal position sensor 37C, an ignition key sensor 37D, a vehicle speed sensor 37E, to name but a few.

Figure 2:
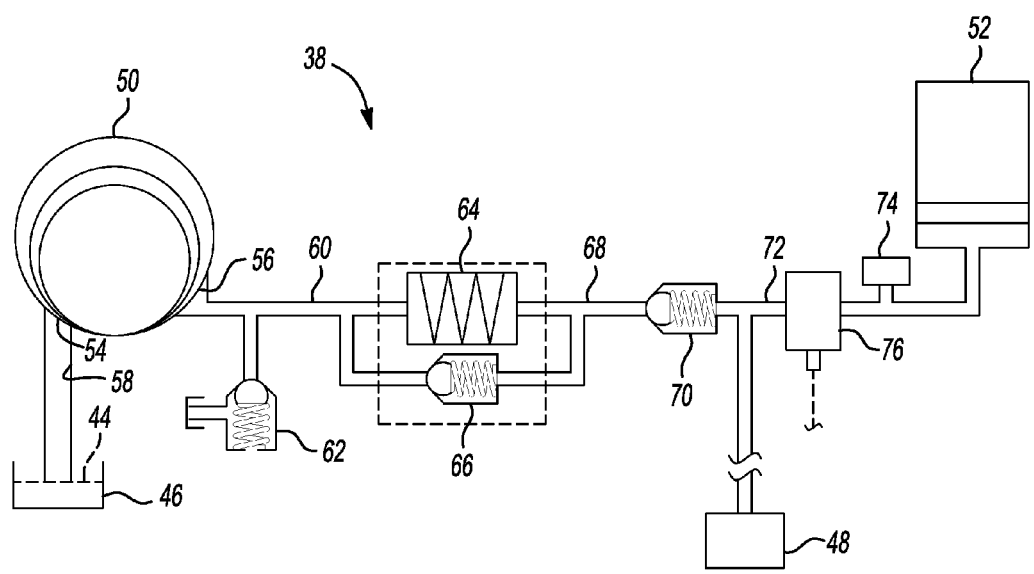
FIG. 2 is a schematic diagram of a portion of an exemplary hydraulic control system.
Figure 3A:
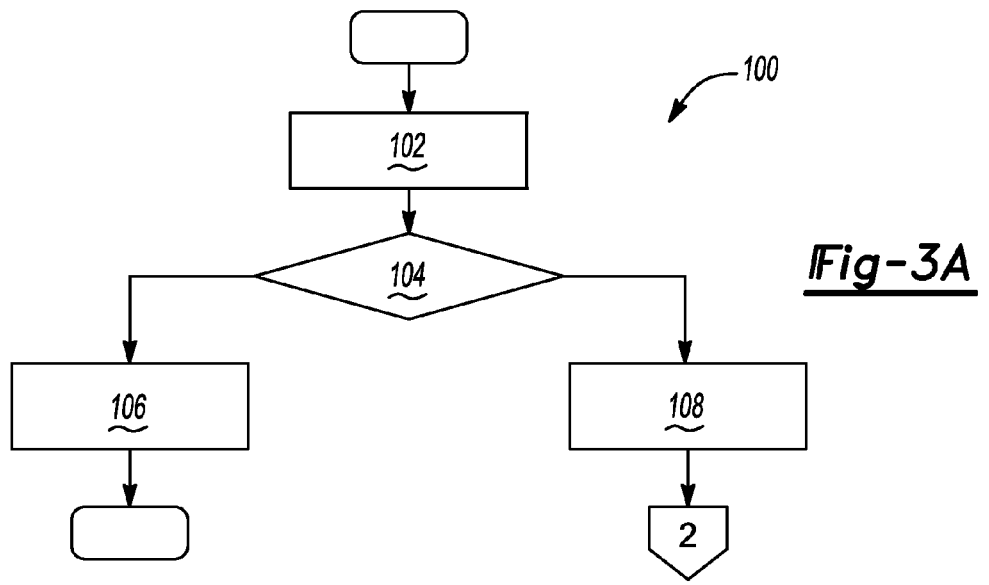
Figure 3B:
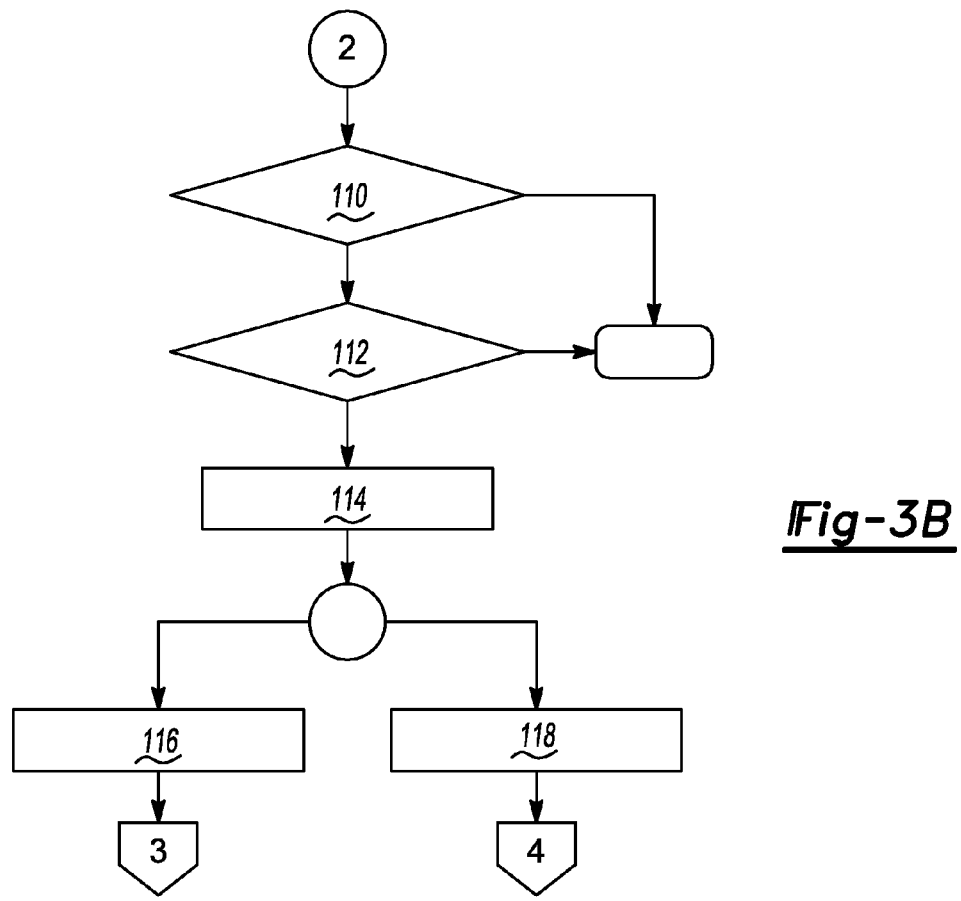

Turning to FIG. 2, a portion of the hydraulic control system 38 is illustrated. At the outset it should be appreciated that the portion of the hydraulic control system 38 shown in FIG. 2 is exemplary and that other configurations may be employed. The hydraulic control system 38 is operable to selectively engage the clutches/brakes 34 by selectively communicating a hydraulic fluid 44 from a sump 46 to a plurality of shift actuating devices 48. The hydraulic fluid 44 is communicated to the shift actuating devices 48 under pressure from either an engine driven pump 50 or an accumulator 52.

The sump 46 is a tank or reservoir to which the hydraulic fluid 44 returns and collects from various components and regions of the automatic transmission 14. The hydraulic fluid 44 is forced from the sump 46 and communicated throughout the hydraulic control system 38 via the pump 50. The pump 50 may be, for example, a gear pump, a vane pump, a gerotor pump, or any other positive displacement pump. The pump 50 includes an inlet port 54 and an outlet port 56. The inlet port 54 communicates with the sump 46 via a suction line 58. The outlet port 56 communicates pressurized hydraulic fluid 44 to a supply line 60. The supply line 60 is in communication with a spring biased blow-off safety valve 62, an optional pressure side filter 64, and an optional spring biased check valve 66. The spring biased blow-off safety valve 62 communicates with the sump 46. The spring biased blow-off safety valve 62 is set at a relatively high predetermined pressure and if the pressure of the hydraulic fluid 44 in the supply line 60 exceeds this pressure, the safety valve 62 opens momentarily to relieve and reduce the pressure of the hydraulic fluid 44. The pressure side filter 64 is disposed in parallel with the spring biased check valve 66. If the pressure side filter 64 becomes blocked or partially blocked, pressure within supply line 60 increases and opens the spring biased check valve 66 in order to allow the hydraulic fluid 44 to bypass the pressure side filter 64.

The pressure side filter 64 and the spring biased check valve 66 each communicate with an outlet line 68. The outlet line 68 is in communication with a second check valve 70. The second check valve 70 is in communication with a main supply line 72 and is configured to maintain hydraulic pressure within the main supply line 72. The main supply line 72 supplies pressurized hydraulic fluid to a control device 76. The control device 76 is electrically controlled by the control module 36 and is operable to control whether the accumulator 52 is charged or discharged. When the control device 76 is open, the accumulator 52 may discharge. When the control device 76 is closed, the accumulator 52 may charge and remain charged. The control device 76 may be an on/off solenoid or a pressure or flow control solenoid.

The main supply line 72 communicates through a hydraulic circuit that may include other control devices, valves, etc., to the plurality of actuating devices 48. The actuating devices 48 may be, for example, piston assemblies that when engaged in turn engage the clutches/brakes 34.

The control device 76 communicates with the accumulator 52 and a pressure sensor 74. The accumulator 52 is an energy storage device in which the non-compressible hydraulic fluid 44 is held under pressure by an external source. In the example provided, the accumulator 52 is a spring type or gas filled type accumulator having a spring or compressible gas or both that provides a compressive force on the hydraulic fluid 44 within the accumulator 52. However, it should be appreciated that the accumulator 52 may be of other types, such as a gas-charged type, without departing from the scope of the present invention. Accordingly, the accumulator 52 is operable to supply pressurized hydraulic fluid 44 back to the main supply line 72. However, upon discharge of the accumulator 52, the second check valve 70 prevents the pressurized hydraulic fluid 44 from returning to the pump 50. The accumulator 52, when charged, effectively replaces the pump 50 as the source of pressurized hydraulic fluid 44, thereby eliminating the need for the pump 50 to run continuously. The pressure sensor 74 reads the pressure of the hydraulic fluid 44 within the main supply line 72 in real time and provides this data to the control module 36. Other types of sensors, such as volume or position sensors, may also be included.

With reference to FIGS. 3A-E, and with continued reference to FIGS. 1 and 2, a method 100 for operating the motor vehicle 5 will now be described. The method 100 is configured to enable an automatic stop-start mode of operation when appropriate. For example, when the motor vehicle 5 stops (i.e., at a red light for example), it may be desirable to shut off the engine 12 in order to improve fuel economy. However, during the engine stop, the pump 50 stops rotating, so there is no pressure in the hydraulic circuit 38 providing oil to the clutches/brakes 34. To start the motor vehicle without delay, the hydraulic circuit 38 should be filled with pressurized oil very fast. Accordingly, the method 100 is configured to selectively discharge the accumulator 52 to prime the clutches/brakes.

For example, the method 100 begins at step 102 where the control module 36 has determined that the motor vehicle 5 has stopped moving or that the motor vehicle 5 is in a condition, such as low vehicle speed, that an engine stop-start may be initiated. The method 100 proceeds to step 104 where the control module 36 determines whether the vehicle 5 has been shut off via an operator keying off the motor vehicle 5. Whether the vehicle 5 has been manually keyed off is, in the example provided, communicated by the ignition sensor 37D to the control module 36. If the engine 12 has been keyed off, the method 100 proceeds to step 106 where the accumulator 52 is discharged prior to the control module 36 shutting down and the method 100 ends. The accumulator 52 is discharged by opening the control device 76.

If the control module 36 determines that the operator of the vehicle 5 has not manually keyed off the ignition, the method 100 proceeds to step 108 where the method 100 enters a subroutine configured to control the charge and discharge of the accumulator 52. At step 110 the control module 36 determines whether an engine stop mode is allowed. Whether an engine stop is allowed is based on various factors including, but not limited to, engine speed, engine temperature, and vehicle speed communicated by the sensors 37A-B and 37E, respectively. For example, if the engine speed exceeds a threshold or the engine temperature is below a threshold or if the vehicle speed exceeds a threshold, the engine stop is not allowed and the method 100 ends. However, if none of the above conditions are met, the method proceeds to step 112.

At step 112, the control module 36 determines whether the operating conditions of the transmission 14 inhibit the engine stop. For example, if the pressure sensor 74 communicates to the control module 36 that the accumulator 52 is not charged (i.e. the sensed pressure is not above a threshold) or not sufficiently charged, the method 100 ends. If, however, the pressure sensor 74 communicates to the control module 36 that the pressure within the main supply line 72 indicates that the accumulator 52 is charged, the method proceeds to step 114. It should be appreciated that other devices other than the pressure sensor 74 may be employed, such as volume sensors, or any other method of indicating the charge state of the accumulator 52 such as an algorithm used to estimate the accumulator 52 charge state.

At step 114, the engine 12 is automatically stopped. As noted above, once the engine 12 has stopped, the pump 50 no longer rotates and the hydraulic circuit 38 must be filled using the accumulator 52. Accordingly, the method 100 proceeds to either step 116 or step 118. Each of steps 116 and 118 initiates a subroutine that controls the state of the accumulator 52. For example, at step 116 the state of the accumulator 52 is controlled by the status of the engine 12. Accordingly, the method proceeds from step 116 to step 120 where the control module 36 determines whether certain engine 12 conditions have been met. These engine 12 conditions may include, for example, whether the engine 12 has been requested to restart, whether the transmission 14 is in a Park condition, the charge level of a vehicle battery or hybrid battery, and an engine stop-start condition. If the engine 12 has been requested to restart and the transmission 14 is not in Park and the engine stop-start variable indicates that engine 12 is at non-conventional start (i.e. an automatic engine restart), then the method proceeds to step 122 where the control module 36 opens the control device 76 and the accumulator 52 is discharged. Discharge of the accumulator 52 fills the hydraulic circuits of the hydraulic control system 38, thereby priming the actuation devices 48 to a ready or "kiss" position to allow the quick engagement of the clutches/brakes 34. However, if the engine 12 has not been requested to restart or the transmission 14 is in Park or the engine stop-start variable indicates a conventional crank (i.e. a high voltage start or key crank), then the method proceeds to step 124 where the control module 36 does not open the control device 76 and the accumulator 52 remains charged. Both of steps 122 and 124 continue to step 126.

Alternatively, as noted above, when the subroutine at 118 is used, the method proceeds from step 118 to step 128. At step 128 the control module determines whether the engine speed is below a threshold and the vehicle speed is below a threshold and whether the transmission 14 is in a forward range selection. If these conditions are not met, the method 100 proceeds to step 130 where the control module 36 does not open the control device 76 and the accumulator 52 remains charged. If, however, the above conditions are met, then the method 100 proceeds to either step 132 or step 134. At step 132, the control module monitors the position of the brake pedal through the brake pedal position sensor 37C. Once the brake pedal has been released, the method 100 proceeds to step 136. Alternatively, at step 134, the control module 36 monitors the position of the brake pedal and after a predefined time limit proceeds to step 136. At step 136 control module 36 opens the control device 76 and the accumulator 52 is discharged. Both of steps 130 and 136 proceed to step 126.

At step 126 the control module 36 determines whether the accumulator 52 was discharged. The control module 36 may determine whether the accumulator 52 was discharged by recording in memory and recalling whether the solenoid 76 was opened or by pressure readings from the pressure sensor 74 or other sensor data (i.e. the accumulator 52 pressure is below a threshold defined by the operating needs of the transmission). If the accumulator 52 was not discharged, the method 100 ends. If the accumulator 52 was discharged, the method proceeds to step 138 where the control module 36 monitors the engine speed. If the engine speed exceeds a threshold for a predefined period of time, the method 100 proceeds to step 140, otherwise the method 100 ends. At step 140 the control module 36 closes the control device 76 in order to allow the accumulator 52 to charge and the method 100 ends.

The description of the invention is merely exemplary in nature and variations that do not depart from the gist of the invention are intended to be within the scope of the invention. Such variations are not to be regarded as a departure from the spirit and scope of the invention.

The following is claimed:

1. A method for controlling a powertrain in a motor vehicle, the powertrain having an engine and a transmission with an accumulator, the method comprising:
   sensing a wheel speed of the motor vehicle;
   determining whether an ignition of the motor vehicle is in an on position;
   shutting off the engine of the motor vehicle if the sensed wheel speed of the motor vehicle is zero and the motor vehicle ignition is in the on position;
   determining a vehicle status; and
   determining whether to discharge the accumulator as a function of the vehicle status.

2. The method of claim 1 further comprising sensing a speed of the engine and charging the accumulator if a charge of the accumulator is below a charge threshold and if the speed of the engine is greater than an engine speed charging threshold for a first predefined period of time.

3. The method of claim 1 wherein the step of determining a vehicle status includes determining if the transmission is in a Park condition and the step of determining whether to discharge the accumulator as a function of the vehicle status includes discharging the accumulator if the engine has been requested to restart and the transmission is not in Park and the ignition is in the on position.

4. The method of claim 1 wherein the step of determining the vehicle status includes sensing an engine output speed, determining if the transmission is in a Park condition and sensing whether a brake pedal of the motor vehicle is depressed and the step of determining whether to discharge the accumulator as a function of vehicle status includes discharging the accumulator if the engine output speed is less than an engine output speed threshold, the wheel speed is less than a wheel speed threshold, the transmission is not in Park and the brake pedal has been depressed for a second predefined time period.

5. The method of claim 4 wherein the step of determining whether to discharge the accumulator as a function of vehicle status includes discharging the accumulator if the brake pedal has been released.

6. The method of claim 1 further comprising
sensing an engine output speed;
sensing an engine temperature;
sensing a transmission temperature; and
inhibiting the engine from shutting off if the sensed engine output speed exceeds an engine output speed threshold, the sensed engine temperature is below a first engine temperature threshold, the sensed engine temperature is above a second engine temperature threshold, the sensed transmission temperature is below a first transmission temperature threshold, or the sensed transmission temperature is above a second transmission temperature threshold.

7. The method of claim 1 further comprising the steps of determining a charge status of the accumulator and inhibiting the engine from shutting off if the charge status of the accumulator is below a charge threshold.

8. A method for controlling a powertrain in a motor vehicle, the powertrain having an engine and a transmission with an accumulator, the method comprising:
sensing a wheel speed of the motor vehicle;
determining whether an ignition of the motor vehicle is in an on position;
shutting off the engine of the motor vehicle if the wheel speed of the motor vehicle is below a wheel speed threshold and the motor vehicle ignition is in the on position;
determining whether an engine restart has been requested;
determining whether the transmission is in Park;
discharging the accumulator if the engine restart has been requested and the transmission is not in Park and the ignition is in the on position;
sensing a speed of the engine; and
charging the accumulator if a charge of the accumulator is below a charge threshold and if the speed of the engine is greater than an engine speed threshold for a predefined period of time.

9. The method of claim 8 further comprising
sensing an engine output speed;
sensing an engine temperature;
sensing a transmission temperature; and
inhibiting the engine from shutting off if the sensed engine output speed exceeds an engine output speed threshold, the sensed engine temperature is below a first engine temperature threshold, the sensed engine temperature is above a second engine temperature threshold, the sensed transmission temperature is below a first transmission temperature threshold, or the sensed transmission temperature is above a second transmission temperature threshold.

10. The method of claim 8 further comprising the steps of determining a charge status of the accumulator and inhibiting the engine from shutting off if the charge status of the accumulator is below a charge threshold.

11. A method for controlling a powertrain in a motor vehicle, the powertrain having an engine and a transmission with an accumulator, the method comprising:
sensing a wheel speed of the motor vehicle;
determining whether an ignition of the motor vehicle is in an on position;
shutting off the engine of the motor vehicle if the sensed wheel speed of the motor vehicle is below a wheel speed threshold and the motor vehicle ignition is in the on position;
sensing an engine output speed;
determining if the transmission is in a Park condition;
sensing the time a brake pedal of the motor vehicle is depressed;
discharging the accumulator if the engine output speed is less than an engine output speed threshold, the wheel speed is less than the wheel speed threshold, the transmission is not in Park and the time the brake pedal has been depressed is greater than a brake time threshold; and
charging the accumulator if a charge of the accumulator is below a charge threshold and if the engine output speed is greater than the engine output speed threshold for a predefined time period.

12. The method of claim 11 wherein the step of discharging the accumulator includes discharging the accumulator if the brake pedal has been released.

13. The method of claim 11 further comprising restarting the engine and discharging the accumulator if an accumulator pressure is below a pressure threshold, a main vehicle battery and/or hybrid battery state of charge is below a charge threshold, the engine is in an auto-stop state for longer than a predefined time period, or the wheel speed is greater than a second wheel speed threshold.

* * * * *